United States Patent [19]
Lovett et al.

[11] Patent Number: 5,949,959
[45] Date of Patent: *Sep. 7, 1999

[54] WELDING METHOD AND APPARATUS

[75] Inventors: Donald C. Lovett, Shelton; David A. Grewell, Waterbury, both of Conn.

[73] Assignee: Branson Ultrasonics Corporation, Danbury, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/890,322

[22] Filed: Jul. 9, 1997

[51] Int. Cl.⁶ .................................................. F21V 9/12
[52] U.S. Cl. ...................... 392/408; 392/407; 156/272.2; 250/504 R
[58] Field of Search .................................... 392/407, 408, 392/418, 419, 421; 219/85.12, 85.13; 250/493.1, 495.1, 503.1, 504 R; 34/266, 268; 313/112; 156/272.2, 380.9; 362/293, 294, 311, 318, 351

[56] References Cited

U.S. PATENT DOCUMENTS

| | | |
|---|---|---|
| 3,247,041 | 4/1966 | Henderson . |
| 3,560,291 | 2/1971 | Foglia . |
| 3,586,417 | 6/1971 | Fields . |
| 3,666,907 | 5/1972 | Nugent et al. . |
| 3,801,773 | 4/1974 | Matsumi . |
| 3,804,691 | 4/1974 | Trivedi . |
| 3,879,164 | 4/1975 | Haldopoulos et al. . |
| 3,914,010 | 10/1975 | Zeller . |
| 3,956,053 | 5/1976 | Staats . |
| 4,419,304 | 12/1983 | Ficke et al. . |
| 4,575,608 | 3/1986 | Wictorin et al. . |
| 4,636,609 | 1/1987 | Nakamata . |

(List continued on next page.)

FOREIGN PATENT DOCUMENTS

| | | |
|---|---|---|
| 193419 | 11/1957 | Austria . |
| 560064 | 2/1958 | Belgium . |
| 0 538 864 A2 | 4/1993 | European Pat. Off. . |
| 1506163 | 12/1966 | France . |
| 2685102 | 6/1993 | France . |
| 226749 | 10/1910 | Germany . |
| 6510316 | 2/1967 | Netherlands . |
| 110028 | 9/1925 | Switzerland . |
| 2125 | 4/1910 | United Kingdom . |
| 468689 | 7/1937 | United Kingdom . |
| 2277808 | 9/1994 | United Kingdom . |
| WO93/00212 | 1/1993 | WIPO . |
| WO 94/22661 | 10/1994 | WIPO . |
| WO 96/40517 | 12/1996 | WIPO . |

OTHER PUBLICATIONS

Robert A. Grimm, "Through–Transmission Infrared Welding of Polymers", ANTEC '96, May 5, 1996, pp. 1238–1244.

Ou, B.S., et al. "Laser Welding of Polyethylene and Polypropylene Plates", ANTEC '92, pp. 1764–1767.

Lever, R.F., "Applying Radiant Heat to Semiconductor Integrated Circuits", IBM Tech. Disclosure, vol. 20, No. 10, Add 3. Mar. 1978.

Yang S. Chen, et al. "Infrared Welding of Polybutylene Terephthalate", ANTEC '95, pp. 1248–1251.

Branson, "Plastics Joining Technology", Branson Ultrasonics Corporation, 1994.

*Primary Examiner*—Teresa Walberg
*Assistant Examiner*—Vinod D Patel
*Attorney, Agent, or Firm*—Harness, Dickey & Pierce, P.L.C.

[57] ABSTRACT

A filter for absorbing electromagnetic radiation which is used in heating a welding zone wherein a first part is joined to a second part. The filter includes a solid material for absorbing undesired wavelengths of radiation from a heating source before the radiation reaches the welding zone. The filter also has a housing which contains a chamber within which a fluid is placed. The fluid cools the solid material and also may absorb undesired wavelengths of radiation from the heating source before the radiation reaches the welding zone. A heat exchanger is connected to the filter in order to cool the fluid during the filtering process.

35 Claims, 2 Drawing Sheets

U.S. PATENT DOCUMENTS

| | | |
|---|---|---|
| 4,985,814 | 1/1991 | Lyons . |
| 5,113,479 | 5/1992 | Anderson et al. . |
| 5,151,149 | 9/1992 | Swartz . |
| 5,177,340 | 1/1993 | Zaffiro . |
| 5,286,327 | 2/1994 | Swartz . |
| 5,300,356 | 4/1994 | Dempster et al. . |
| 5,313,034 | 5/1994 | Grimm et al. . |
| 5,338,492 | 8/1994 | Panzer et al. . |
| 5,348,604 | 9/1994 | Neff . |
| 5,444,814 | 8/1995 | Hofius, Sr. . |
| 5,520,801 | 5/1996 | Gerber et al. . |
| 5,522,954 | 6/1996 | Bennett et al. . |
| 5,538,626 | 7/1996 | Baumann et al. . |

WELDING METHOD AND APPARATUS

BACKGROUND AND SUMMARY OF THE INVENTION

The present invention relates generally to welding. It relates more particularly to an improved method and apparatus for welding plastics and like materials utilizing electromagnetic radiation.

Welding is commonly used to join plastic or resinous parts, such as automobile thermoplastic parts, at a welding zone. Lasers have been used to provide the heat necessary to perform the welding operation (for example, see U.S. Pat. No. 4,636,609 which is expressly incorporated herein by reference). Lasers provide a focused beam of electromagnetic radiation at a specified frequency (i.e., coherent monochromatic radiation). However, lasers tend to be more expensive relative to other heating sources.

Less expensive heat producing sources, such as infrared heating lamps, are also used to provide infrared radiation for heating the welding zone. One such process is Through-Transmission Infrared Welding (TTIR). The TTIR technique utilizes infrared radiation which passes through at least one plastic part (sometimes called the "transmission piece") in order to heat the welding zone in at least one other piece and to provide sufficient heat to join at least two parts.

Infrared heating lamps emit noncoherent radiation which typically has a much broader frequency range (i.e., polychromatic) than laser sources. Some of the frequencies within that broader range produce undesirable results. These undesirable results include heating portions of the parts beyond the desired or targeted welding zone. This can result in turn in undesirable effects, including deformation and marking of the overall part.

Solid materials have been used to selectively filter or absorb these undesirable frequencies before the radiation reaches the target parts. However, solid filters suffer from several disadvantages, including uncontrolled build-up of heat, as well as having to be continually replaced due to the damage or degradation caused by the radiation or heat by-product. The degradation of the solid filter over a period of time inhibits the performance of the solid filter to absorb the undesirable wavelengths. It is also difficult to adequately cool solid filters in many applications with such present technology as blowing cool air upon the solid filters.

A primary object of the present invention includes providing an improved welding apparatus and method utilizing a filter or filter system of unique design which obviates the disadvantages of the aforementioned prior filters and is less costly. Several embodiments of the invention are disclosed.

Additional advantages and features of the present invention will become apparent to the skilled artisan from the subsequent description and the appended claims, taken in conjunction with the accompanying drawings in which:

DESCRIPTION OF THE PREFERRED EMBODIMENTS

Figure 1:
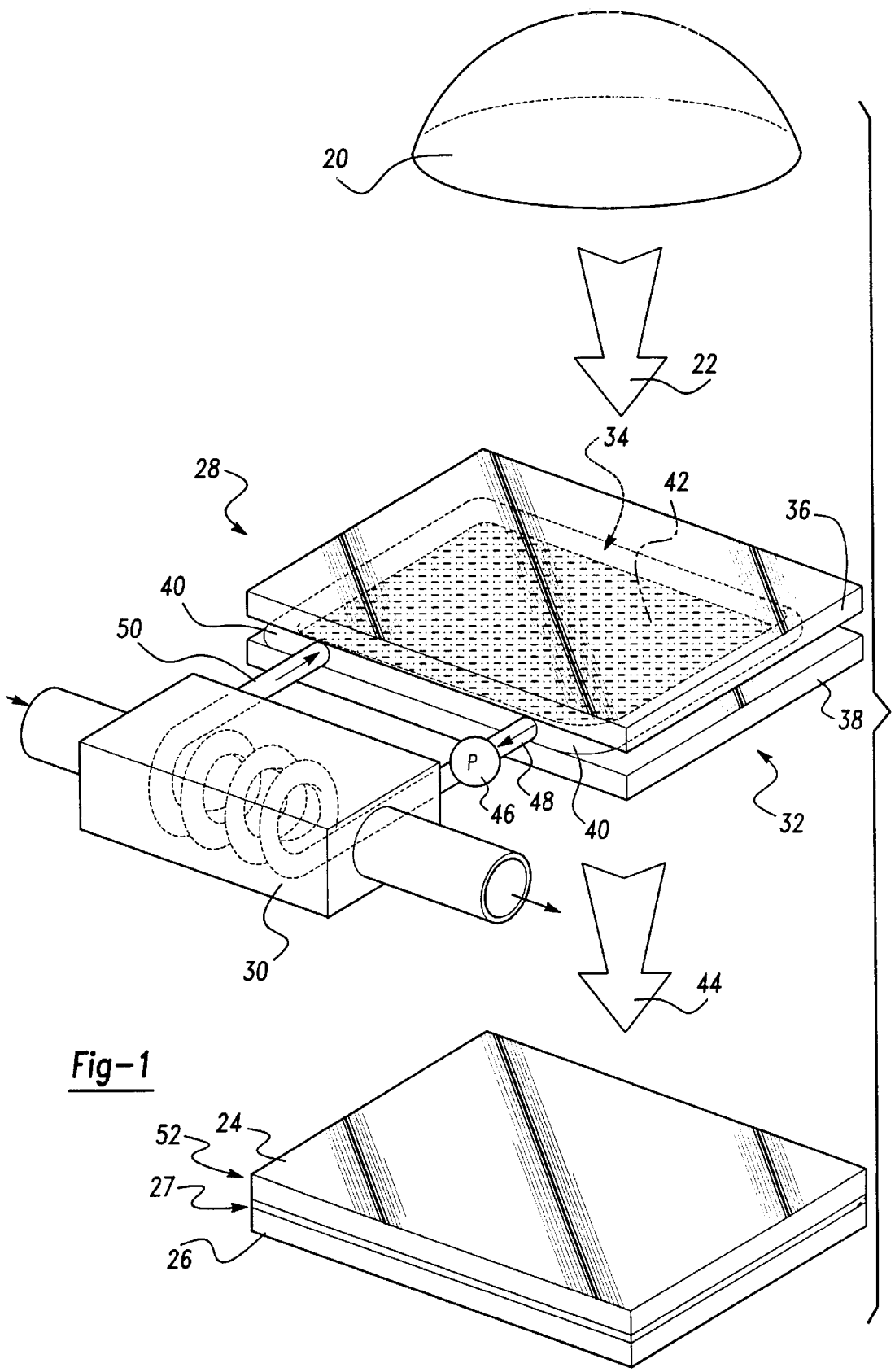
FIG. 1 is a diagrammatic perspective view depicting an apparatus employing the present invention.

Referring to FIG. 1, there is disclosed a welding apparatus comprising a radiant heating lamp 20 which emits noncoherent polychromatic electromagnetic radiation 22 in order to weld a first part 24 to a second part 26 at welding zone 27. A uniquely designed filter 28 is disposed between the radiant heating lamp 20 and the first part 24 to absorb undesired wavelengths included in radiation 22. A heat exchanger 30 is provided to maintain filter 28 within a desired temperature range while filter 28 is in use.

Filter 28 includes a housing 32 having a chamber 34 defined by a first plate 36 and a second plate 38, the first and said second plates being generally parallel (if flat as shown), and a peripheral seal 40 disposed therebetween. First plate 36 and second plate 38 filter part of radiation 22 emanating from radiant heating lamp 20 by absorbing substantially all of the undesired wavelengths of radiation 22 before it can reach first part 24. The filtering produces filtered radiation 44. Optionally, a clamp (not shown) can be used to maintain the structural integrity of the housing 32 by clamping the first plate 36 to the second plate 38.

In accordance with the present invention, chamber 34 contains a cooling or cooling/filtering fluid 42 which cools first plate 36 and second plate 38. However, in the preferred embodiment, fluid 42 also filters part of radiation 22 emanating from radiant heating lamp 20 to produce filtered radiation 44.

In a TTIR application, the first part 24 transmits the filtered radiation 44 to welding zone 27. The filtered radiation 44 heats the welding zone 27 in order to weld first part 24 to second part 26. Significantly, the absorption of the undesired wavelengths by filter 28 allows welding zone 27 to be adequately heated without the filtered radiation 44 causing overall damage to or undesired effects in first part 24 or second part 26.

The present invention includes at least one of the plates being used as a solid filter, providing some or all of the filtering function. For example, first plate 36 and second plate 38 may be of substantially the same material as first part 24 (or at least the plates should have substantially the same absorption profile as first part 24). Accordingly, if first part 24 is a polycarbonate plastic part, then first plate 36 and second plate 38 are also polycarbonate plastic parts. Moreover, fluid 42 may act as a cooling or heat transfer agent, or it may preferably act as both a partial filter and as a cooling or heat transfer agent. The following may be used in determining the thicknesses of the plates (36 and 38): the particular application; the intensity of the radiation 22 from the radiant heating lamp 20; whether fluid 42 is acting as a filtering fluid; and whether both plates (36 and 38) are being used to filter.

It will be appreciated by the skilled artisan that the composition selection of the first plate 36 and second plate 38 and fluid 42 will generally be dependent upon several factors, most importantly its ability to absorb the undesired or harmful wavelengths of the radiation 22 employed in the particular application. For example, in at least one preferred embodiment, first plate 36 and second plate 38 and fluid 42 should absorb the wavelengths of radiation 22 in the range from about 1 micron to about 5 microns for welding conventional thermoplastic polymeric materials. More preferably, they should absorb the wavelengths of radiation 22 in the range from about 1.3 microns to about 4 microns for welding such polymeric materials.

Conventional polymeric materials which are particularly useful for welding by the practice of the present invention are preferably selected from the thermoplastic class of materials. These materials can be categorized in several ways. The preferred materials are generally classified as engineering thermoplastics (ETPs); they are also sometimes classified as thermoplastic elastomers (TPEs); thermoplastic polyolefins (TPO); and thermoplastic polyurethanes (TPUs). This would include such materials as polycarbonates, high heat polycarbonates, polycarbonate blends (e.g., polyurethane/polycarbonate blends), styrenes, styrene blends such as acrylonitrile-butadiene-styrene copolymers (ABS), polycarbonate/ABS blends, polyamides, polyamide blends, acrylic-styrene-acrylonitriles (ASAs); acrylonitrile-ethylene-propylene-styrenes (AEWS), styrene-acrylonitrile-copolymer, styrene-maleic anhydrides, and the like. In a highly preferred embodiment, they include (without limitation) such materials as polycarbonates, acrylics, and polystyrene materials.

Fluid 42 is preferably a liquid which should have a relatively high boiling point. The relatively high boiling point allows fluid 42 to absorb a significant amount of heat and also to not evaporate or boil during the filtering process. Fluid 42 should have a boiling point (with pressure considerations being taken into account with respect to the following boiling points) of at least about 120° F., more preferably at least about 240° F., and ideally at least about 350° F., either under atmospheric conditions, or when contained in the chamber or system.

When fluid 42 acts as both a partial filter and as a cooling or heat transfer agent in the preferred embodiment, the preferred cooling/filtering fluid is a mixture of liquids comprising dimethyl esters of glutaric, adipic, and succinic acids. Such a dimethyl ester mixture is available commercially and may be obtained from such sources as Du Pont under the tradename of Aliphatic Dibasic Esters; such materials are also known under the tradenames/synonyms of Dibasic Ester, Dibasic Ester Mixture, and DBF. Such materials are generally mixtures of materials of the formula $CH_3COO(CH_2)_nCOOCH_3$, wherein n is an integer value from about 1 to about 5, more preferably from about 2 to about 4. In a highly preferred embodiment, the fluid 42 is a mixture comprising about 55–75 percent (by weight) of dimethyl glutarate, about 10–25% dimethyl adipate, and about 19–26% dimethyl succinate.

Other examples of useful materials employed when the fluid is primarily employed as a cooling fluid or agent include materials which transmit (do not absorb) the radiation that is desired to effect the welding. These include materials selected from the group consisting of glycerol, ethylene-glycerol, dioctyl phthalate, tributyl phosphene, mineral, and mixtures or derivatives of these materials. However, it is to be understood that the present invention is not limited to this fluid nor to fluids of these absorption wavelengths or boiling points, but includes other fluids, such as but not limited to gas compositions, whose physical characteristics are sufficient to filter undesirable radiation from any heating source used in a welding operation for any appropriate material.

Additives may also be employed in the cooling or cooling/filtering fluid so long as they do not substantially degrade the absorption profile of the liquid in any materially adverse way. For example, viscosity modifiers, thermal and UV stabilizers, colorants, pigments, visual indicators, and the like may be employed.

When fluid 42 acts only as a cooling or heat transfer agent in the present invention, fluid 42 may be a liquid containing 1, 2, 3, 4, 5, 5-hexachloro-1,3-cyclopentadiene with a molecular weight of about 272.77 and a boiling point of between about 235 degrees Celsius and 238 degrees Celsius which may be obtained from such sources as Aldrich Chemical Company, Inc. Generally, the liquid should be substantially free from hydrocarbon absorptions or similar absorption profiles. Accordingly, organic fluids whose hydrogen atoms have been displaced in whole or in part by halogen atoms are preferred. Moreover, if the fluid is a liquid within this embodiment it may comprise water. It is to be understood that the present invention within this embodiment is not limited to liquids of this composition but includes those liquids which provide adequate cooling to the absorbing plates while absorbing little of the radiation themselves.

A heat exchanger 30 is connected in fluid communication to filter 28 in order to cool fluid 42 while filter 28 is absorbing the undesired wavelengths from radiation 22. Pump 46 is preferably disposed in a supply line 48 between chamber 34 and heat exchanger 30. The present invention also includes other techniques besides using pump 46 to transport fluid 42 between chamber 34 and heat exchanger 30, such as but not limited to, transportation of fluid 42 through standard convection techniques.

A return line 50 returns the cooled fluid to chamber 34. Any conventional heat exchanger 30 and pump 46 may be used in accordance with standard practices. During the filtering operation, heat exchanger 30 preferably maintains fluid 42 at a predetermined temperature range, e.g., preferably a range that would include from about 65° F. to about 120° F. The continual removal of heated fluid from filter 28 with the resupply of cooled fluid into filter 28 provides filter 28 with a longer operational life than that experienced by known solid filters.

In a preferred embodiment, fluid 42 is contained in chamber 34 which has the following dimensions: one-fourth inches by twelve inches by one-eighth inches. However, it is to be understood that the dimensions of chamber 34 varies according to the particular application. Also in a preferred embodiment, about one-hundred percent of chamber 34 was filled with the Dibasic Ester fluid from Du Pont. Additionally, in a preferred embodiment, radiant heating lamp 20 is an ELC 250 watt 24 volt ac quartz-halogen General Electric reflector lamp, having either a multilayer dichroic coating for selectively reflecting preferred wavelengths, or an aluminized coating for reflecting relatively all visible and infrared radiation from the quartz-halogen source.

Figure 2A:
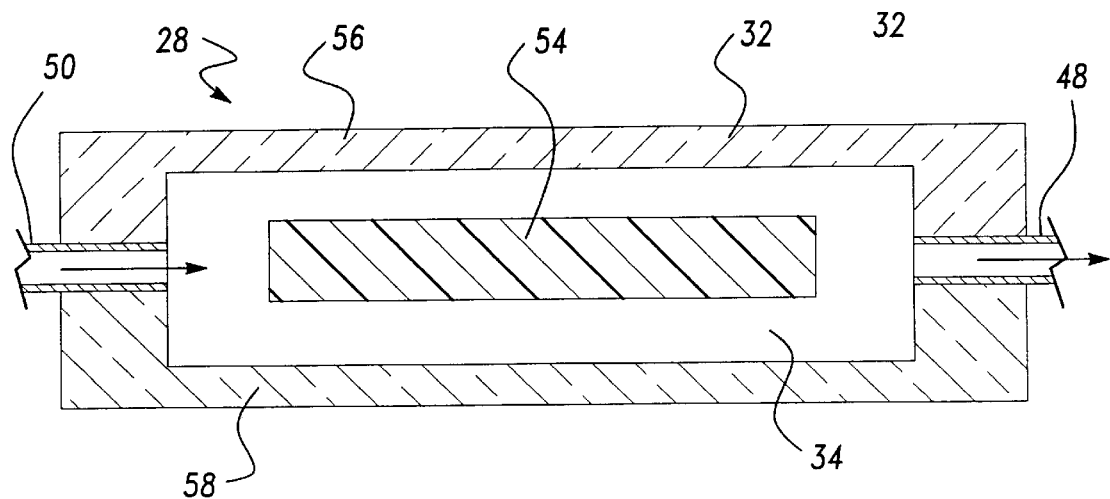
FIG. 2a is a side view depicting an alternate embodiment of the present invention.
Figure 2B:
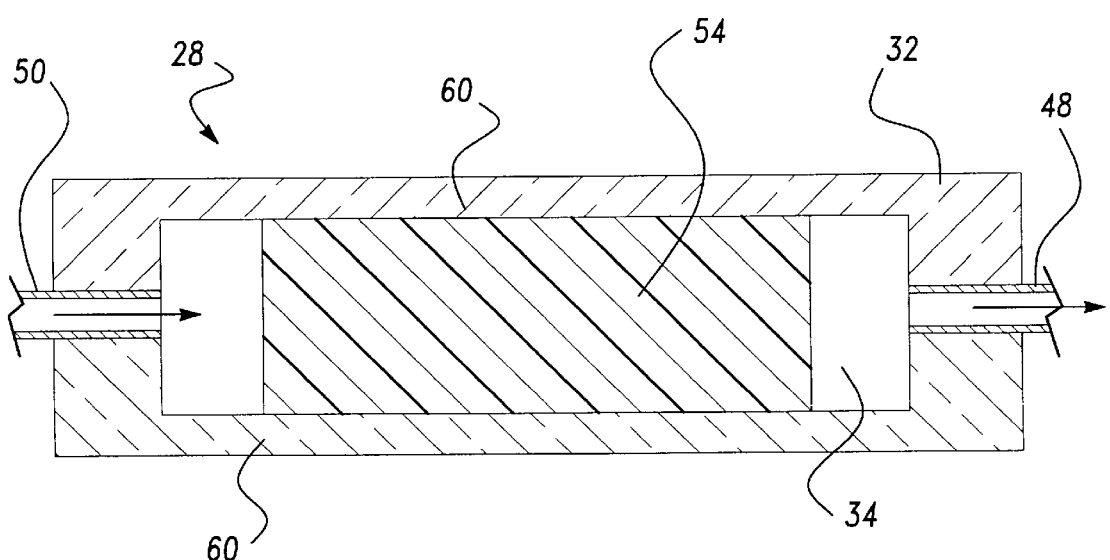
FIG. 2b is a top view depicting an alternate embodiment of the present invention.

FIGS. 2a and 2b illustrate a side view and a top view respectively of an alternate embodiment for filter 28. Referring to FIG. 2a, housing 32 defines a chamber 34 which contains a solid material 54. Solid material 54 is transparent to the welding energy or radiation of interest and absorbs predetermined wavelengths of the radiation before the radiation reaches the welding zone. The radiation enters filter 28 through a top plate 56 and is filtered by solid material 54 before exiting filter 28 through a bottom plate 58.

Moreover, solid material 54 is cooled by a fluid which enters chamber 34 through return line 50 and exits chamber 34 through supply line 48. As disclosed above, the fluid may act as a cooling or heat transfer agent, or it may preferably act as both a partial filter and as a cooling or heat transfer agent.

Top plate 56 and bottom plate 58 are generally parallel or equidistant from each other. Top plate 56 and bottom plate 58 are preferably quartz plates which are obtainable from such sources as Quartz Scientific, Inc. These quartz plates have thicknesses of about one-eighth of an inch and are separated (or spaced) by a distance sufficient to accommodate solid material 54 and to allow adequate cooling of solid material 54 by the fluid.

It is to be understood, however, that the present invention is not limited to only quartz plates or to these dimensions or shapes. The present invention includes such other embodiments as those plates which transmit substantially all of the wavelengths of the radiation from a radiant heating lamp. Moreover, another alternate embodiment of the present invention includes at least one of the plates (56 or 58) being made of material functionally equivalent to solid material 54 in order to provide additional filtering capability.

Referring to FIG. 2b, solid material 54 is connected through conventional techniques (e.g., glued or bolted) to sides 60 of housing 32 for support. However, it is to be understood that the present invention in this alternate embodiment is not limited to solid material 54 being supported only at sides 60 of housing 32, but includes such other support mechanisms as will allow solid material 54 to be supported within housing 32 while still allowing solid material 54 to adequately absorb the predetermined wavelengths of the radiation.

EXAMPLE

Referring back to FIG. 1, the present invention is specially well-suited for the TTIR welding of a first plastic part to a second plastic part. In one exemplary use of the present invention, first part 24 is a transmitting plastic 24 which is to be welded to second part 26. Transmitting plastic 24 has the characteristic of absorbing little of the filtered radiation 44 as it transmits the filtered radiation 44 to the welding zone 27. For this example, transmitting plastic 24 and second part 26 may be polycarbonate plastic parts.

According to a preferred embodiment, an absorbing material 52 is placed in welding zone 27 to generate heat upon the filtered radiation 44 reaching the welding zone 27. Sufficient heat is generated by the absorbing material 52 so as to weld the transmitting plastic 24 to the second part 26. The absorbing material 52 contained carbon black; however, other absorbing materials can be used which would generate sufficient heat to weld the parts.

For this example, the radiant heating lamp 20 was operated in the following manner (with filter 28 in place) in order to weld the transmitting plastic 24 to the second part 26: radiant heating lamp 20 was operated at eighty percent to ninety percent of its rated voltage level to heat the absorbing material 52 (a ramp time of one-half to one second was used); radiant heating lamp 20 remained at that level between about six to about nine seconds; and radiant heating lamp 20 was operated at between about five percent to about thirty percent of its rated voltage level during the idle portions of the welding cycle.

Operation of radiant heating lamp 20 in the aforementioned manner substantially increased the useful life of the radiant heating lamp 20. However, it is to be understood that the present invention is not limited to these operational ranges. The operational ranges may vary depending upon the particular radiant heating lamp 20 used and the parts to be welded. For example, the present invention includes operating radiant heating lamp 20 within a voltage range which has a lower limit of about sixty percent of the voltage level rating of the radiant heating lamp 20.

With respect to TTIR applications, first plate 36 and second plate 38 and fluid 42 employed in the preferred embodiment are materials whose absorption properties or profile are as close as possible to the transmitting plastic 24. In some instances, it may be possible to use a prepolymer comprising one or more of the same monomers as the transmitting plastic 24. Further, suitable derivatives of the monomers may be employed. Additionally, first plate 36 and second plate 38 and fluid 42 employed in the preferred embodiment transmit those wavelengths of the radiation 22 which are needed by the absorbing material 52 to heat welding zone 27.

Additionally, the present invention also includes those TTIR applications wherein the second part 26 itself contains absorbing material 52 at least sufficiently near to the welding zone 27 so as to generate the heat needed to weld the transmitting plastic 24 to the second part 26.

The embodiments which have been set forth above were for the purpose of illustration and were not intended to limit the invention. For example, the present invention is not limited to only welding applications, but includes those applications where filtering of undesired wavelengths is desired. Moreover, it will be appreciated by those skilled in the art that various changes and modifications may be made to the embodiments discussed in the specification without departing from the spirit and scope of the invention as defined by the appended claims.

It is claimed:

1. A method for filtering electromagnetic radiation used to heat a welding zone, comprising the steps of:
   emitting said radiation from a heating source;
   absorbing predetermined wavelengths of said radiation by a solid material to produce filtered radiation;
   cooling said absorbing solid material with a fluid, said fluid being disposed in a chamber of a housing; and
   providing said filtered radiation to said welding zone.

2. The method according to claim 1 further comprising the step of:
   absorbing the predetermined wavelengths of said radiation by said fluid to produce said filtered radiation.

3. The method according to claim 2 further comprising the step of:
   cooling said fluid.

4. The method according to claim 3 further comprising the step of:
   providing a heat exchanger for reducing the temperature of said fluid.

5. The method according to claim 4 further comprising:
   pumping said fluid to said heat exchanger.

6. The method according to claim 1 wherein said housing includes first and second plates defining said chamber, said solid material being used at least as one of said plates.

7. The method according to claim 6 wherein a second solid material is contained within said chamber for absorbing said predetermined wavelengths of said radiation to produce said filtered radiation.

8. The method according to claim 1 wherein said housing includes first and second plates defining said chamber, said first and second plates transmitting substantially all wavelengths of said radiation.

9. The method according to claim 8 wherein said solid material is contained within said chamber.

10. The method according to claim 8 wherein said first and second plates are quartz plates sealed together to form said chamber.

11. The method according to claim 1 wherein said fluid is a liquid, said liquid having a boiling point above about 120° F.

12. The method according to claim 11 wherein said liquid is an organic compound with at least one halogen atom being substituted for a hydrogen atom on said organic compound.

13. The method according to claim 1 wherein said fluid is a liquid which absorbs predetermined wavelengths of said radiation before said radiation reaches said welding zone.

14. The method according to claim 13 wherein said absorbed predetermined wavelengths of said radiation includes wavelengths of radiation above at least 1 micron.

15. The method according to claim 14 wherein said absorbed predetermined wavelengths of said radiation includes radiation from at least about 1.2 microns to about 4 microns.

16. The method according to claim 15 wherein said liquid being dimethyl esters of glutaric, adipic and succinic acids.

17. The method according to claim 1 wherein the wavelengths of said radiation are substantially within the infrared electromagnetic spectrum.

18. The method according to claim 1 wherein said radiation is produced from a radiant heating lamp.

19. The method according to claim 1 wherein said welding zone defines an area for welding a first and second plastic part, said first part transmitting substantially all wavelengths of said filtered radiation.

20. The method according to claim 19 wherein said second part absorbs second predetermined wavelengths of said radiation.

21. The method according to claim 19 wherein said welding zone includes an absorbing material which is heated by said filtered radiation in order to weld said first and second part.

22. The method according to claim 19 wherein said radiation is produced from a radiant heating lamp, said method further comprising the step of:

providing a heat exchanger for reducing the temperature of said fluid.

23. The method according to claim 1 wherein said solid material is substantially the same material as said first part.

24. The method according to claim 1 wherein said solid material is substantially motionless in said fluid while said solid material absorbs said predetermined wavelengths of said radiation.

25. The method according to claim 21 wherein said radiation is produced from a radiant heating lamp, said method further comprising the step of:

providing a heat exchanger for reducing the temperature of said fluid.

26. The method according to claim 19 wherein said radiation is produced from a radiant heating lamp, said radiant heating lamp having a predetermined voltage level rating, said method further comprising the step of:

operating said radiant heating lamp at a first predetermined range in order to heat said welding zone, said first predetermined range having a lower limit of about sixty percent of said predetermined voltage level rating.

27. The method according to claim 26 wherein said first predetermined range is from about seventy percent of said predetermined voltage level rating to about ninety percent of said predetermined voltage level rating.

28. The method according to claim 1 wherein said radiation is produced from a radiant heating lamp, said radiant heating lamp having a predetermined voltage level rating, said method further comprising the step of:

operating said radiant heating lamp at a first predetermined range in order to heat said welding zone, said first predetermined range having a lower limit of about sixty percent of said predetermined voltage level rating.

29. The method according to claim 28 further comprising the step of:

providing a ramp time of between about 0.5 to about 1 seconds to reach said first predetermined range for said radiant heating lamp.

30. The method according to claim 1 wherein said radiation is produced from a radiant heating lamp, said radiant heating lamp being operated according to steps (a)–(c):

(a) operating said radiant heating lamp at a first predetermined range in order to heat said welding zone, said first predetermined range having a lower limit of about sixty percent of said predetermined voltage level rating;

(b) idling said radiant heating lamp at a second predetermined range, said second predetermined range having a lower limit of about five percent of said predetermined voltage level rating; and (c) operating said radiant heating lamp at said first predetermined range in order to heat said welding zone, wherein step (c) is performed subsequent to step (b).

31. The method according to claim 30 wherein said second predetermined range has an upper limit of about thirty percent of said predetermined voltage level rating.

32. The method according to claim 30 further comprising the step of:

providing a ramp time of between about 0.5 to about 1 seconds to reach said first predetermined range for said radiant heating lamp.

33. A method of heating a welding zone, comprising the steps of:

emitting electromagnetic radiation from a heating source toward said welding zone;

absorbing predetermined wavelengths of said radiation by a solid material prior to said radiation reaching said welding zone;

cooling said absorbing solid material with a liquid.

34. The method according to claim 33 wherein said liquid is disposed in a chamber of a housing.

35. The method according to claim 33 further comprising the step of:

providing a heat exchanger for reducing the temperature of said liquid.

* * * * *